Patented Aug. 25, 1936

2,052,000

UNITED STATES PATENT OFFICE 2,052,000

LACQUER

Fritz Oschatz, Mannheim, Germany, assignor to I. G. Farbenindustrie Aktiengesellschaft, Frankfort-on-the-Main, Germany No Drawing. Application May 7, 1934, Serial No. 724,462. In Germany May 12, 1933

15 Claims.  (Cl. 134—26)

The present invention relates to valuable lacquers and a process of producing same.

It has already been proposed to employ polymeric vinyl halides as a lacquer base, but the elasticity of the coatings prepared therewith is unsatisfactory even when softening agents are added; furthermore their adhesion to wood and metals is very slight. Polymeric vinyl chloride can scarcely be combined with drying and nondrying oils, such as, for example, linseed oil, China-wood oil or castor oil. Thus, for instance, from coatings prepared with polymeric vinyl chloride added castor oil sweats out at but slightly elevated temperatures, and additions of linseed oil and China-wood oil cause turbidity in films.

I have now found that very valuable lacquers can be prepared by incorporating polymeric vinyl halides which contain more halogen than corresponds to the formula $$(CH_2=CH-halogen)_n$$

(in which $n$ indicates the number of the molecules of mono-vinyl halide contained in the polymerized product and is immaterial for the definition of the content in halogen) with condensation products of polycarboxylic acids, polyhydric alcohols and mono-carboxylic acids containing more than six carbon atoms (which may be used also in the form of their esters) and with solvents. Suitable solvents are liquids capable of dissolving the said polymeric vinyl compounds and, consequently, also their mixtures with the said condensation products. Such solvents are, for example, butyl acetate, acetone, cyclohexanone and methyl cyclohexanone. Usually mixtures of solvents are employed with advantage, for example, mixtures of ketones (such as those mentioned above) or esters (such as ethyl formate, ethyl acetate, butyl acetate, benzyl acetate, methyl propionate, glycol ether and the like) with hydrocarbons of the benzene series (such as benzene, toluene and xylene) or chlorinated hydrocarbons (such as methylene chloride and ethylene chloride).

Polymeric vinyl halides, such as polymeric vinyl bromide and especially polymeric vinyl chloride, of the said kind may be prepared by the treatment of polymeric vinyl halides with halogen, preferably in the presence of solvents or diluents and of catalysts, for example, according to the British Patent No. 401,200. Good effects are obtained with chlorinated polymeric vinyl chlorides containing from about 60 to 70 per cent of chlorine. Such polymeric vinyl chlorides contain more chlorine than corresponds to the formula:

$$(CH_2=CH-Cl_{1.14})_x$$

The condensation products referred to above may be prepared, for example, from aliphatic, cycloaliphatic or aromatic polycarboxylic acids, such as phthalic, isophthalic, terephthalic, tetrahydrophthalic, maleic and succinic acid, condensation products of maleic acid with terpinene and like acids as the first component, from glycol, glycerine and polyhydric alcohols derived from sugars, such as mannitol, as the polyalcoholic component, and from aliphatic, cycloaliphatic or aromatic monocarboxylic acids containing more than 6 carbon atoms, such as linoleic acid, ricinoleic acid, ricinenic acid (the acid obtainable by splitting off water from ricinoleic acid), coconut fatty acid, soy-bean oil fatty acid, linseed-oil fatty acid, colophony or the resinic acids contained therein, wood oil acid and the like or the esters of the said acids as the third component.

The said condensation products may be used in varying amounts; proportions of between 30 and 400 per cent of the weight of the polymeric vinyl halide of the kind defined being very suitable.

The solvents are usually used in amounts of from 50 to 90 per cent of the whole mixture (polymeric vinyl compound + condensation product + solvent), but the invention is not restricted to such proportions.

The lacquers may be prepared by first dissolving one component in the solvent and then dissolving the other one in the liquid or by simultaneously dissolving the different components in the solvent or by dissolving each component in a solvent and mixing the solutions. The dissolution is effected at ordinary or slightly elevated temperature.

Lacquers (which term is intended to include varnishes) obtained in this manner are distinguished by an excellent adhesive power on different substrata, such as, for example, metal, wood, leather or textiles, and also by high fastness to weather and light and good elasticity. They may be employed as colorless coating varnishes or lacquers and may also be colored in the usual manner with soluble dyestuffs such as Sudan dyestuffs. The products may also be incorporated with inorganic pigments, such as zinc oxide, barium sulphate or colcothar, or organic pigments, such as Lithol Fast Scarlet RN, Hansa Yellow G, Pigment Green B, Indanthrene Blue GGSL powder, colored varnishes or paints being thus obtained. The said organic pigments are usually added in amounts of from 10 to 20 per cent by weight of the non-volatile constituents of the lacquer, while inorganic pigments are usually employed in higher proportions.

If desired, softening agents, such as phthalic esters, for example, di-n-butyl phthalate, phosphoric esters, for example, tricresyl phosphate, or with special advantage chlorinated diphenyl, may be incorporated with the lacquer or varnish compositions.

The coatings formed after evaporation of the solvent, have a composition corresponding to that of the non-volatile part of the lacquer, i. e. they are composed of the polymeric vinyl halides of the kind defined above, the condensation products defined above and, as the case may be, of further additions, such as softeners, pigments and the like, in the proportions as indicated above.

The following examples will further illustrate the nature of this invention, but the invention is not restricted to these examples. The parts are by weight.

*Example 1*

10 parts of chlorinated polymeric vinyl chloride having a content of about 64 per cent of chlorine and obtainable according to Example 1 of the said British Patent No. 401,200, 5 parts of a condensation product derived from 1 molecular proportion of castor oil, 2½ molecular proportions of phthalic anhydride and 2 molecular proportions of glycerine, (or 3 molecular proportions of glycol) and 3 parts of chlorinated diphenyl (or 3 parts of di-n-butyl phthalate) are dissolved in a mixture of normal butyl acetate and toluene (1:1), a lacquer which adheres well to metals and wood and which has a high elasticity and good stability to weather and light being thus obtained. The lacquer may be applied by spraying, painting or dipping and may be colored if desired with pigments, such as zinc oxide, colcothar or Lithol Fast Scarlet RN, or soluble dyestuffs such as Sudan Yellow 3G or Sudan Black BT.

*Example 2*

20 parts of a condensation product derived from 1 molecular proportion of linseed oil, 3½ molecular proportions of phthalic anhydride and 3 molecular proportions of glycerine and 5 parts of polymeric vinyl chloride having a chlorine content of about 64 per cent obtainable according to Example 1 of the said British Patent No. 401,200 are dissolved in a mixture of equal parts of normal butyl acetate and toluene. The resulting solution is triturated with 10 parts of iron oxide red, an excellent rust-proof paint being obtained. Instead of condensation products prepared by means of phthalic acid also such products may be used as are obtained by means of isophthalic, terephthalic and tetrahydrophthalic acid.

*Example 3*

10 parts of polymeric vinyl chloride having a chlorine content of about 68 per cent obtainable according to Example 2 of the said British Patent No. 401,200 are dissolved in 40 parts of a mixture of equal parts of acetic acid ethyl ester and benzene. 30 parts of a condensation product obtainable by condensing 1 molecular proportion of terpinene with 1 molecular proportion of maleic acid and further condensing the product thus obtained with 1.35 molecular proportions of glycerine and 2.2 molecular proportions of linseed oil, are dissolved in 30 parts of acetone. The two solutions are mixed with one another.

The lacquer is then triturated with 20 parts of zinc white and 0.3 part of lead-cobalt-manganese naphthenate is added.

The mass obtained may be spread on wood; it has a high speed of drying. The coating formed is distinguished by good fastness to weather.

What I claim is:—

1. Coating compositions comprising a polymeric vinyl halide containing more halogen than corresponds to the formula

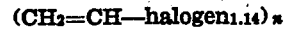
$(CH_2=CH-halogen_{1.14})_x$ and a condensation product of a polycarboxylic acid, a polyhydric alcohol and a monocarboxylic acid containing more than 6 carbon atoms.

2. Coating compositions comprising a polymeric vinyl halide containing more halogen than corresponds to the formula

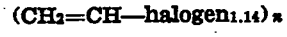
$(CH_2=CH-halogen_{1.14})_x$ and between 30 and 400 per cent of the weight of the said polymerized vinyl halide, of a condensation product of a polycarboxylic acid, a polyhydric alcohol and a monocarboxylic acid containing more than 6 carbon atoms.

3. Coating compositions comprising a polymeric vinyl chloride containing more chlorine than corresponds to the formula

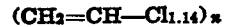
$(CH_2=CH-Cl_{1.14})_x$ and between 30 and 400 per cent of the weight of the said polymeric vinyl chloride, of a condensation product of a polycarboxylic acid, a polyhydric alcohol and a monocarboxylic acid containing more than 6 carbon atoms.

4. Lacquers comprising a polymeric vinyl halide containing more halogen than corresponds to the formula

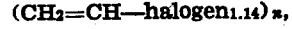
$(CH_2=CH-halogen_{1.14})_x$, a condensation product of a polycarboxylic acid, a polyhydric alcohol and a monocarboxylic acid containing more than 6 carbon atoms and a solvent.

5. Lacquers comprising a polymeric vinyl halide containing more halogen than corresponds to the formula

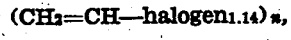
$(CH_2=CH-halogen_{1.14})_x$, a condensation product of a polycarboxylic acid, a polyhydric alcohol and a monocarboxylic acid containing more than 6 carbon atoms and a mixture of solvents.

6. Lacquers comprising a polymeric vinyl chloride containing more chlorine than corresponds to the formula

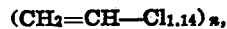
$(CH_2=CH-Cl_{1.14})_x$, a condensation product of a polycarboxylic acid, a polyhydric alcohol and a monocarboxylic acid containing more than 6 carbon atoms and a solvent.

7. Lacquers comprising a polymeric vinyl chloride containing more chlorine than corresponds to the formula

$(CH_2=CH-Cl_{1.14})_x$, a condensation product of a polycarboxylic acid, a polyhydric alcohol and a monocarboxylic acid containing more than 6 carbon atoms and a mixture of solvents.

8. Lacquers comprising a polymeric vinyl halide containing more halogen than corresponds to the formula a condensation product of a polycarboxylic acid, a polyhydric alcohol and a monocarboxylic acid containing more than 6 carbon atoms and, from 50 to 90 per cent by weight of the whole lacquer, of a solvent.

9. Lacquers comprising a polymeric vinyl halide containing more halogen than corresponds to the formula $$(CH_2=CH-halogen_{1.14})_n,$$

a condensation product of a polycarboxylic acid, a polyhydric alcohol and a monocarboxylic acid containing more than 6 carbon atoms and, from 50 to 90 per cent by weight of the whole lacquer, of a mixture of solvents.

10. The process of producing lacquers, which comprises mixing with one another a polymeric vinyl halide containing more halogen than corresponds to the formula $$(CH_2=CH-halogen_{1.14})_n,$$

a condensation product of a polycarboxylic acid, a polyhydric alcohol and a monocarboxylic acid containing more than 6 carbon atoms and a solvent.

11. The process of producing lacquers, which comprises mixing with one another a polymeric vinyl halide containing more halogen than corresponds to the formula $$(CH_2=CH-halogen_{1.14})_n,$$

a condensation product of a polycarboxylic acid, a polyhydric alcohol and a monocarboxylic acid containing more than 6 carbon atoms, a dyestuff pigment and a solvent.

12. The process of producing lacquers, which comprises mixing with one another a polymeric vinyl halide containing more halogen than corresponds to the formula $$(CH_2=CH-halogen_{1.14})_n,$$

a condensation product of a polycarboxylic acid, a polyhydric alcohol and a monocarboxylic acid containing more than 6 carbon atoms, a softening agent and a solvent.

13. The process of producing lacquers, which comprises mixing with one another a polymeric vinyl halide containing more halogen than corresponds to the formula $$(CH_2=CH-halogen_{1.14})_n,$$

a condensation product of a polycarboxylic acid, a polyhydric alcohol and a monocarboxylic acid containing more than 6 carbon atoms, chlorinated diphenyl and a solvent.

14. The process of producing lacquers, which comprises mixing with one another a polymeric vinyl chloride containing more chlorine than corresponds to the formula $$(CH_2=CH-Cl_{1.14})_n,$$

a condensation product of a polycarboxylic acid, a polyhydric alcohol and a monocarboxylic acid containing more than 6 carbon atoms and a solvent.

15. The process of producing lacquers, which comprises mixing with one another a polymeric vinyl halide containing more halogen than corresponds to the formula $$(CH_2=CH-halogen_{1.14})_n,$$

between 30 and 400 per cent of the weight of the said polymeric vinyl halide, of a condensation product of a polycarboxylic acid, a polyhydric alcohol and a monocarboxylic acid containing more than 6 carbon atoms and between 100 and 900 per cent by weight of the said two components, of a solvent.

FRITZ OSCHATZ.